Oct. 30, 1962 R. C. McDOWELL ET AL 3,060,496
APPARATUS FOR MAKING NODULES OR PELLETS
Filed Feb. 29, 1956 2 Sheets-Sheet 1

INVENTORS
ROBERT C. McDOWELL
EDWARD A. GAMBON
BY
ATTORNEY

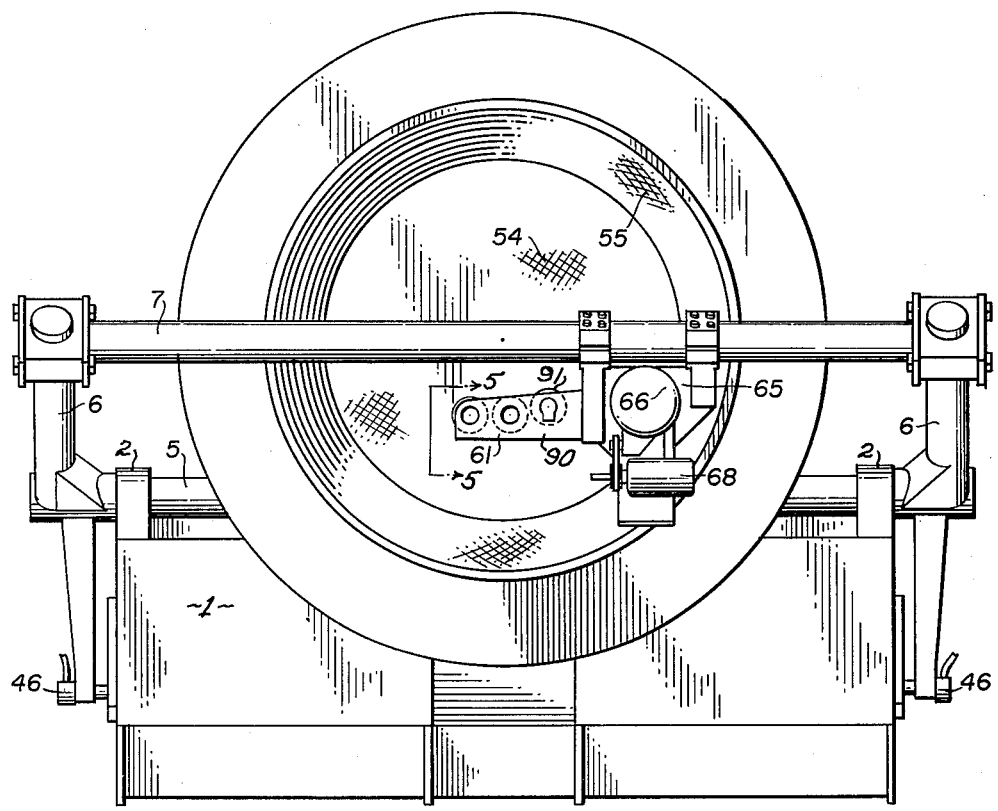
*Fig. 2*
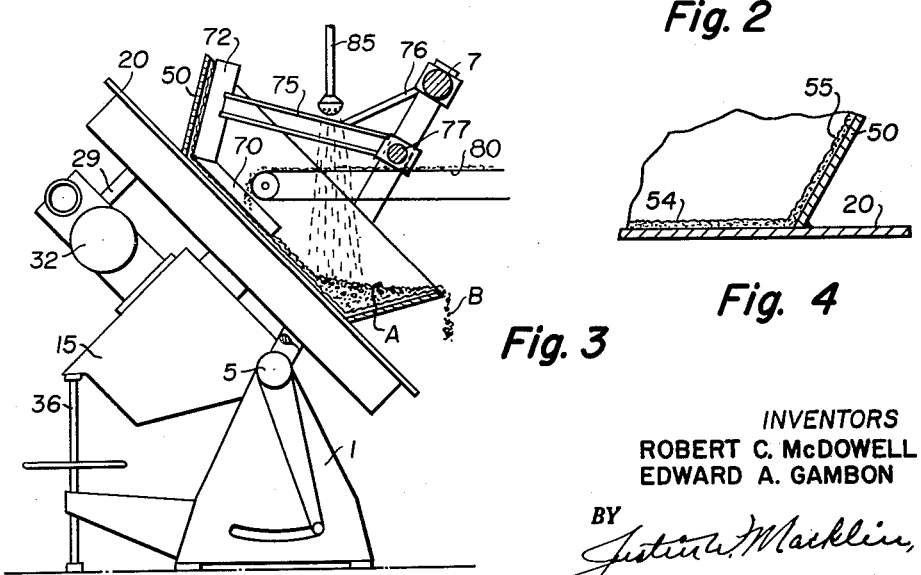
*Fig. 3*
*Fig. 4*
INVENTORS
ROBERT C. McDOWELL
EDWARD A. GAMBON
ATTORNEY United States Patent Office 3,060,496
Patented Oct. 30, 1962

1

3,060,496
APPARATUS FOR MAKING NODULES
OR PELLETS
Robert C. McDowell, Lakewood, and Edward A. Gambon, Cleveland, Ohio, assignors to McDowell Company, Inc., Cleveland, Ohio, a corporation of Ohio
Filed Feb. 29, 1956, Ser. No. 568,628
5 Claims. (Cl. 18—1)

The present invention relates to an apparatus for making pellets, small rounded masses or balls of finely ground or pulverized material such as cement mixes, ore concentrates, or other materials, in preparation for subsequent treatment in which it is desirable to have the material in the form of pellets or balls.

The invention lends itself to the efficient making of such nodules or balls of various materials, and for many kinds of subsequent treatment, such as burning in furnaces, sintering, and analogous processes.

The pelletizing or balling of crushed, finely powdered materials for such uses and other steps and treatment, as well as for handling and shipment, is being required in increasingly larger quantities than heretofore due to the development of markets, the extensive developments in the beneficiation of low grade ores, the greatly increased quantities of cement mixes and the like, wherefore, there is a present need for pelletizing and balling apparatus for handling much larger quantities in shorter periods of time than has heretofore been practical or necessary.

Accordingly, a general object of the present invention is to provide a balling machine capable of handling greatly increased quantities of materials, and pelletizing and balling the same efficiently in continuous operations.

Another general object is to accomplish the mixing of powdered or ground materials and to effect pellet or ball forming while controlling size within desired ranges.

In carrying out our invention, we provide a machine in the nature of a large, flat rotating pan mounted on an axis at an angle such that its bottom portion is sloping sharply and its side wall is so shaped and positioned as to effectively perform the functions required.

Still another object of the invention is to provide a simple, efficient and durable balling machine adapted to perform the functions required, and which may be of such size and design as to effectively handle relatively greatly increased quantities of material and to deliver pellets or balls of superior characteristics and usability at rates, for example, of many tons per hour. The rotary speed applied to the material, its angle of falling and rolling movement on the bottom surface of the pan or saucer to which the material containing portion may be likened, the relation of the mass and its weight to the depth permitted to accumulate, all have a bearing upon effective control and processing of the material to be balled; wherefore, a specific important object is to prevent the mass of material being pelletized from becoming too deep and heavy at any one zone, which would result in packing and destroying partly formed pellets, and otherwise impeding the balling operation.

A further object is to so position and arrange the circular side wall zone around a flat, inclined portion of the saucer or pan that the rotary motion imparted to the material and the pellets being formed may further function in respect to this rolling action in a fashion to continuously effect the bringing of the larger pellets to the surface. This function may be utilized to separate and, to some extent, to assort the balls and pellets of different sizes.

The slope of the pan and the corresponding relative position of the fixed, outwardly flaring side walls may be required to be varied for different kinds of materials and the degree of moisture content and consequent adhesive properties and consistencies; wherefore, a further object is to provide a simple and effective means for accurately adjusting the angle of the axis of rotation and thus of the slope.

Likewise, it is desirable to provide simple means for changing the speeds of rotation.

Still further objects include the provision of means causing the formation of a uniform coating of the moist material being treated, and assuring that this coating adheres to the bottom and side walls of the saucer or pan. Such a coating has the effect not only of preventing wear on the surface, but it is effective in causing the material to be moved upwardly uniformly as the saucer or pan rotates, and likewise assuring a most effective cascading and rolling action for forming of the pellets or balls.

It is desirable to effect some distribution of the falling material, and to this end we provide deflecting scrapers which may be adjustable toward and away from adjacent surfaces which may be set at different angular positions with relation to the upper and lower portions of the sloping pan. We may also provide laterally oscillating and distributing elements for spreading and distributing the material as it rolls and cascades across the pan.

Utilizing a revolving, substantially flat disk with outwardly flaring side walls forming a pan-shaped vessel, rotating the same on an axis such that the slope of the bottom of the pan is only slightly greater than the normal angle of repose of the material in the condition in which it is being treated, and while delivering material preferably to the upper portion of the revolving bottom surface, assures a falling and rolling downwardly on one side while lifting the material upwardly substantially to an uppermost portion on the opposite side, with resultant cascading, rolling and turbulent action.

The permitting of somewhat thicker body of material to gather at the lower portion of the pan causes an effective intermingling action, and so fills the portion as to permit controlled overflow.

All of these factors contribute to a mixing action which may be most effectively used for blending a sinter mix material. This action, when imparted to fine solids, may be more effective than the functions usually performed with a pug mill or ribbon type mixer. It has advantages over the action or function of a pug mill because of its effective dispersing and intermingling of the fine and coarse solids of the material in the moving, turbulent state being uniform, and it may treat much larger quantities of material with less power than mixers such as a pug mill require.

The material is delivered in the form of some small nodules and some coarser material or pellets, and the treated material may be delivered directly to a sintering machine, where its relatively high permeability aids the ultimate sintering action. Such an action is referred to in the joint application of the present inventor-applicants and of their co-inventor, Thomas E. Ban, filed February 15, 1956, Serial No. 565,639.

The various features of our invention may be embodied in a simple, durable machine capable of efficient operation, the various parts of which, however, may be modified and altered without departing from the scope of the appended claims. A preferred form of such a machine is illustrated in the accompanying drawings, in which:

FIG. 2 is a plan view looking toward the balling pin or saucer, as indicated by the lines 2—2 of FIG. 1;

FIG. 3 is a view similar to FIG. 1, on a reduced scale, showing the scraper mounting and material feeding and illustrating the balling action;

FIG. 4 is a sectional detail at the juncture between the bottom disk and saucer side wall showing the material coating retaining screen.

Figure 1:
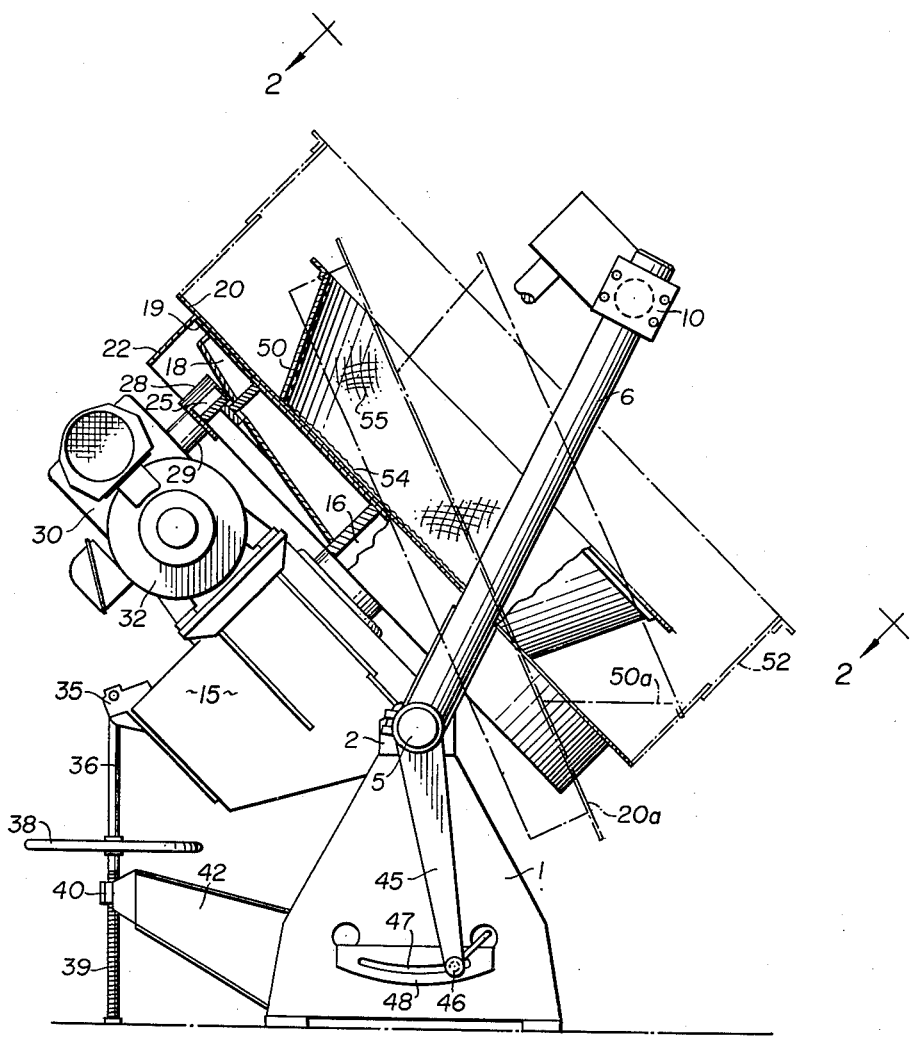
FIG. 1 is a side elevation, partially in vertical section, through the balling pin or saucer and its immediate mounting support, and showing the pivoted mounting and associated driving mechanism.

Heretofore, industries have used pellet forming apparatus, the vessels or containers of which are rotated or revolved to roll and tumble the material. Previously, these containers have taken various forms, and have been referred to by such terms as "balling drums," "pans, "disks," or "cones." For example, in the somewhat related copending application of Edward A. Gambon and Harold E. Rowen, entitled Pelletizing Apparatus, and filed March 6, 1956, Serial No. 569,919, a much deeper, truncated, flat bottom, cone-type, pelletizing revolving container is used. In contrast, it seems appropriate to refer to the rotating portion of the present machine as a "saucer" inasmuch as it has a large disk-like bottom and relatively shorter, outwardly flaring or sloping side wall.

Describing our present invention by reference to the drawings, a base frame may comprise a box-like housing 1, the side walls of which converge upwardly, and on the ends of which are bearings 2 for a transverse horizontal, rigid shaft 5 of an appropriate size for supporting the balling apparatus and driving mechanism, as well as the scraping means.

On each end of the shaft 5 are rigidly fixed, upwardly extending parallel arms 6 connected by a cross bridging member 7 attached by clamping means, indicated at 10, at its ends to each of the arms 6. The cross bridging member 7 serves to support scrapers and material stirring means, as will presently appear.

Intermediate the bearings 2, and rigidly carried on the shaft 5, is a housing support 15 within which are mounted suitable bearings for a shaft 16 carrying a supporting spider-like wheel, one of the spoke-like arms of which is indicated at 18, and on which is mounted a flat, circular disk which may comprise one or two contiguous plates, as at 19 and 20, the plate 19 in turn carrying a circular guard, indicated at 22. Rigidly mounted with the spider and disk is a large gear 25 which may be driven by a pinion 28 carried on a shaft 29 projecting from a motor and change speed gear driving unit 30, the motor of which is indicated at 32 and which, in turn, is adjustably but firmly secured to the supporting housing 15.

Attached to the rearward portion of the housing 15 is a bracket carrying the pivot 35 connected by a rotating bearing, not shown, with the upper end of a jackscrew 36 in turn having a hand wheel 38 and a threaded portion 39 extending through a pivoted nut 40, in turn carried by the rearwardly extending bracket 42 rigid with the housing 1.

It will be seen that by turning the screw 36, the housing 15 and driving mechanism may be swung with the shaft 5, which in turn will carry the upwardly extending arms 6 with it, and change the angle of the shaft 16 and the axis of rotation, and thus change the slope of the bottom of the large circular disk.

As a means for securely locking the driving and rotating structure at any adjusted angle, arms 45 are rigidly connected with the ends of the shaft 5 and extending downwardly at the ends of the housing, where a locking means 46, in the nature of a screw clamp, may coact with a plate 47 having an arcuate slot 48 curved about the axis of the shaft 5. Thus, to adjust the angular position of the apparatus, the clamping means 46 are released, the hand wheel 38 is turned to swing the structure supported on the shaft 5 to the desired position, whereupon, the clamping means 46 are again tightened.

The circular disk 20 forms the bottom portion of the saucer or pan proper, while its rim or side wall is formed of an outwardly flaring wall 50 rigid with a disk plate 20 and concentric or coaxial with the shaft 16. The angle of this wall 50 is such that the lower side or segment thereof normally slopes upwardly somewhat from a horizontal position, as shown in FIGS. 1 and 3. The height of this conical flaring wall 50 is preferably from one-fourth to one-third of its small diameter, at the junction with the bottom plate or disk 20.

In the drawings the disk 20 is shown as extending outwardly beyond the perimeter of the side wall 50. Obviously, the disk and driving structure heretofore described may be fitted with a side wall of larger diameter. In the treating of certain materials, where the primary purpose is mixing for instance, the sloping cone wall 50 may be omitted and a cylindrical wall of a height and proportion, such as indicated in broken lines 52, may be rigidly connected at the perimeter of the disk 20.

It will be noted that these broken lines indicate the cylindrical wall 52 being made in two sections. This is to illustrate that different heights of cylindrical wall may be used. If the structure is used as shown, with the conical wall 50 within that of any outer retaining wall, such as 52, the outer wall defines a secondary mixing annular chamber which may receive material discharged over the outer lip of the conical wall 50. However, for the purpose of the present invention, and particularly for pelletizing, the operative portion of the saucer comprises the flat disk bottom and a conical wall 50 of appropriately selected diameter and height.

The bottom of the saucer and the inner surface of the side wall is shown as lined with a retaining mesh, such as woven wire or expanded metal, indicated at 54 and 55. This lining material may be secured as by spot welding or other convenient means.

It is desirable to provide for impacting a portion of the moist material being treated on the surfaces where they may be held by this lining material.

Furthermore, it is desirable to provide deflecting and scraping means which have a motion toward and away from the center of rotation, and which engage the material while rolling and cascading downwardly on the face of the disk—principally at one side of the center of rotation.

The copending application, above identified as filed on February 15, shows, describes, and claims such a distributing and compacting scraping means. Accordingly, the drawings of the present application have only a somewhat diagrammatic showing of an oscillating scraper means.

Figure 5:
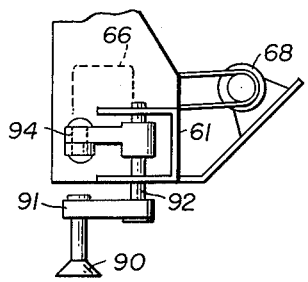
FIG. 5 is a detail, in elevation, illustrating the mechanical mounting for the transversely movable bottom scrapers and distributing elements looking toward the left of the corresponding parts appearing in FIG. 2.

Referring particularly to FIGS. 2 and 5, a bracket 65 is mounted on the cross arms, and a gearing and driving connection, indicated at 66, is shown as driven by a motor 68 to oscillate the scrapers carried on a laterally extending arm structure 61, extending inwardly toward and below the center of the disk 20.

The oscillating scrapers 90 are shown as rigidly carried on swinging arms 91 mounted on shaft 92, in turn actuated by crank arms 94 connected by means not shown, with a suitable crank or cam, not shown, driven by the gearing means 66. Thus, as the disk of the saucer is rotating, the scraper elements 90 may be oscillated transversely of the path of the material and at different rates of oscillation of several or many cycles for each revolution of the saucer.

In addition to intercepting and distributing the falling and cascading material on the disk, these oscillating members 90 also serve to pack and continuously rebuild a layer of material on the disk and retaining means 54.

The stationary scraper 70 is shown as lying along and slightly spaced from a disk surface 20 and its lining, which may serve to limit the orbital motion of the material as well as to limit the thickness of the lining.

A scraper 72 is shown as extending parallel to the flaring surface of the wall 50. This scraper 72 limits the thickness of the material held by the lining 55, and also serves to deflect material tending to carry too far beyond the upper central position or 12 o'clock position, looking at the saucer as in FIG. 2. Thus, the material is caused to roll across the greater distances of the sloping flat bottom of the saucer.

Mounting means providing for angular positioning and for adjusting the spacing between the scraper elements and their adjacent surfaces 20 and 50 are indicated diagrammatically in FIG. 3 at 75 and 76, as connected with the cross member 7. A second member 77, similar to the cross member 7, may be connected to the arms 6 and form a part of the scraper support.

In operation the powdered material to be pelletized may be brought to the saucer and be discharged against the bottom thereof. The preferred original contact of the fresh material with the saucer is in a zone corresponding to that between 3 and 5 o'clock, assuming the saucer is rotating in clockwise direction.

Referring to the diagrammatic view of FIG. 3, a belt conveyor for the material, indicated at 80, is shown as discharging the powdered material against the bottom of the saucer. During a continued rotation of the saucer, an accumulation is built up, as indicated at A, and a portion of this accumulation is carried upwardly around the left hand side of the bottom and side wall 50 of the saucer, forming first small particles, "seeds" or kernels, which accumulate material and increase in size as they roll downwardly across the sloping bottom of the saucer and intermingle with and cascade over fresh finer particles. The larger pellets, when attaining the desired size, roll outwardly over the lower lip of the saucer, as indicated at B, the zone of discharge being normally in the range of 7 and 8 o'clock, some discharge occurring from the bottom position.

The effectiveness of the combined sloping disk and the rolling and cascading action effected by it, coupled with the building up of a limited depth of the body of the fine material and the partially formed pellets extending from the outer lip or rim of the wall 50 and inwardly to the upwardly sloping portion of the disk, provides a very effective uniform operation.

It is important to note that the angle of the slope of the side wall 50 is such that much less depth from the surface of the material along the bottom portion and to the point of discharge is permitted than as though the side wall were cylindrical and formed a deep right angle corner annulus.

In treating various kinds of materials, the speed of operation and angle of the disk, and, of course, the angle of the lower segment of the side wall, may be changed and, in fact, it has been found quite critical to select the most suitable angle and speed to suit the material. The adjustment permitting a change of angle is indicated in broken lines in FIG. 1, where the disk is thus shown at 20a and the side wall at 50a. The material is normally moist when discharged onto the disk bottom, but additional moisture may be supplied as by a spray nozzle indicated at 85 in FIG. 3.

The amount of lateral movement of the distributing and spreading elements 90 may be varied to suit the conditions and to effect the best distribution of the falling material and maintenance of a uniform coating on the disk surface.

The maintaining of uniform distribution, the deflecting of the material at the proper sector of the revolution of the saucer, and the subjecting of the material to different peripheral speeds along the flaring side wall have been found to most effectively treat materials of different grades of fineness and different degrees of moisture and varying weights and consistencies. Surprisingly improved results in a high percentage of the delivery of desired sizes of pellets in relatively very large quantities, as compared to balling drums and the like previously used, have been attained with this apparatus.

In its operation, the slope of the disk, the angle of the flaring side wall, and the speed and resulting centrifugal force are all factors which combine to produce surprisingly effective results. These angles limit the depth of the material at the lower sector, as described, and the shape of the surface permits the centrifugal force to aid in discharging the larger pellets or particles under the most desirable conditions as to size, uniformity and quantity.

The factors of the angle of the disk and the amount of moisture may be determined by a brief trial, after which these and all other conditions may be maintained.

Continuous operation with uniform delivery of pellets ranging within the desired sizes has been accomplished at the rate of several to many tons per hour, with apparatus made according to the present invention and having an outer saucer diameter ranging from a few feet to fifteen or more feet in diameter.

We claim:

1. A pelleting apparatus for moisture pulverulent material comprising a frusto-conical drum of relatively small depth, said drum being open at its wide end and closed at its narrow end, the included angle of the drum being not less than approximately 40° and the axis of rotation of the drum forming an angle with the horizontal equal to approximately one-half of the included angle of the drum.

2. A mixing and pelletizing apparatus comprising in combination, a pan-like container having a flat bottom and an outwardly flaring continuous side wall concentric about its central axis, a base, means mounting the bottom of the container on the base in radial spaced relation from the central axis and at a tilted angle such that moist comminuted material fed into the container tends to roll and fall across the slope of the bottom during rotation of the container, means for rotating the container on its central axis, and means for feeding comminuted material into the container during rotation.

3. A mixing and pelletizing apparatus comprising in combination, a pan-like container having a flat bottom and an outwardly flaring continuous side wall concentric about a central axis, a base, means for rotating the container on its central axis, means tiltably mounting the bottom of the container on the base in radial spaced relation from the axis of rotation, means coacting between the base and the container to adjustably tilt the container and thereby move its axis of rotation in an arcuate path about the tilt axis to vary the angle of repose of contained material relative to the bottom of the container such that moist material tends to roll and fall across the slope of the bottom during rotation, and means for feeding comminuted material to the container during rotation.

4. The apparatus of claim 2 wherein the height of the side wall is from one fourth to one third of the diameter of the container bottom.

5. The apparatus of claim 2 wherein said material feeding means includes scraper elements for distributing the material in the container and a frame surmounting the open end of the container and operably supporting the scraper elements in the container, said frame being tiltably mounted on the base for tilting movement with the container.

References Cited in the file of this patent

UNITED STATES PATENTS

| 2,411,873 | Firth | Dec. 3, 1946 |
| 2,726,959 | Lushbough, et al. | Dec. 13, 1955 |

FOREIGN PATENTS

| 181,807 | Australia | Apr. 25, 1955 |
| 21,840 | Finland | Aug. 8, 1947 |
| 915,072 | Germany | July 15, 1954 |